United States Patent [19]
Othman et al.

[11] Patent Number: 5,804,949
[45] Date of Patent: Sep. 8, 1998

[54] THYRISTOR-CONTROLLED SERIES CAPACITOR TRIGGERING SYSTEM

[75] Inventors: Hisham A. Othman, Cary; Kevin J. Timko, Apex, both of N.C.

[73] Assignee: Asea Brown Boveri AB, Västerås, Sweden

[21] Appl. No.: 409,354

[22] Filed: Mar. 23, 1995

[51] Int. Cl.$^6$ ....................... G05F 1/70
[52] U.S. Cl. ................ 323/209; 323/205
[58] Field of Search ............. 323/205, 206, 323/207, 208, 209; 363/39, 40; 307/102

[56] References Cited

U.S. PATENT DOCUMENTS

| | | | |
|---|---|---|---|
| 4,292,545 | 9/1981 | Hingorani | 307/102 |
| 4,355,241 | 10/1982 | Hingorani | 307/102 |
| 4,434,376 | 2/1984 | Hingorani | 307/102 |
| 5,202,583 | 4/1993 | Larsen et al. | 307/102 |
| 5,227,713 | 7/1993 | Bowler et al. | 322/58 |
| 5,374,853 | 12/1994 | Larsen et al. | 307/102 |
| 5,420,495 | 5/1995 | Hingorani | 323/218 |
| 5,424,627 | 6/1995 | Clark et al. | 323/210 |
| 5,434,497 | 7/1995 | Larsen | 323/209 |

OTHER PUBLICATIONS

Vithayathil et al., "Case Studies of Conventional and Novel Methods and Reactive Power Control of an AC Transmission System," International Conference on Large High Voltage Electric Systems, 1988 Session, Aug. 28–Sep. 3, 1988.

*Primary Examiner*—Matthew V. Nguyen
*Attorney, Agent, or Firm*—Woodcock Washburn Kurtz Mackiewicz & Norris LLP

[57] ABSTRACT

A trigger control system for a thyristor-controlled series capacitor (TCSC) is disclosed. In one application, a power system 10 is coupled to a load 12 by a series capacitor 14 connected in parallel to a thyristor unit 16 and inductor 17. The thyristors are triggered by the control system 18, which includes a first circuit 20 that generates signals proportional to the peak of the line currents, a stabilizer circuit 22, an adder 24, a look-up table 26, a conversion circuit 28, a pulse generator 30, a phase-locked loop (PLL) 32, a ramp generator 34, a trigger window circuit 36, and a three input AND gate 38 the output of which is a grid pulse signal 40 that triggers the thyristor unit 16. The control system diminishes power swing oscillations and subsynchronous resonance oscillations.

7 Claims, 6 Drawing Sheets

Figure 5A
CAPACITOR VOLTAGE

Figure 5B
THYRISTOR CURRENT

Figure 5C
INCREASE IN CAPACITOR VOLTAGE BOOST

THYRISTOR-CONTROLLED SERIES CAPACITOR TRIGGERING SYSTEM

FIELD OF THE INVENTION

The present invention relates generally to the field of electric power transmission and distribution, and more particularly to a system for dynamically controlling a reactance (e.g., a thyristor-controlled series capacitor (TCSC)) coupled to a transmission or distribution system to mitigate unwanted power swing and subsynchronous resonance oscillations.

BACKGROUND OF THE INVENTION

The present invention is preferably employed in controlling the triggering of the thyristors of a thyristor-controlled series capacitors (TCSC) in order to control power flow, dampen power oscillations, and mitigate subsynchronous resonance(s) (SSR). Subsynchronous resonance can be damaging to generators if left uncontrolled, since it causes fatigue in the shafts of thermal turbine-generators that requires costly repairs or replacement of units.

Other systems have been proposed for controlling the triggering of TCSC and for mitigating subsynchronous resonances. For example, U.S. Pat. No. 4,292,545,Sep. 29, 1981, titled "Method and Means For Damping Subsynchronous Oscillations And DC Offset In An AC Power System," to Hingorani, discloses a thyristor-controlled series capacitor in series with a transmission line. The disclosed method triggers a thyristor valve in a fixed time period after a zero-crossing of the voltage across a capacitor in parallel with the thyristor. This system uses a resistor in series with the thyristor to dampen subsynchronous oscillations.

In U.S. Pat. No. 4,434,376, Feb. 28, 1984, titled "Method And Means For Damping Subsynchronous Oscillations and DC Offset In An AC Power System," which is related to the '545 patent, the firing time is adjusted relatively slowly based upon a measurement of the frequency of the AC power system network voltage or current. In U.S. Pat. No. 4,355,241, Oct. 19, 1982, titled, "Means For Damping Subsynchronous Oscillations In An AC Power System Including Overload Protection," also to Hingorani, overload protection is added by triggering the thyristor valve in response to an over-voltage condition across a series reactance comprising a plurality of tuned circuits each of which may be tuned to a separate undesirable subsynchronous frequency.

In a 1988 paper by J. J. Vithayathil et al., titled, "Case Studies of Conventional and Novel Methods of Reactive Power Control on an AC Transmission System," it is suggested that, by partial conduction of an inductor across a series capacitor, the effective compensation level of the series capacitor can be substantially varied. This article suggests that this could be beneficial for stabilizing power systems. However, the article discloses that the inductor is controlled in the manner disclosed by Hingorani—that is, based on timing signals derived from zero-crossings of the capacitor voltage. The Vithayathil scheme also involves determining a firing time by assuming a purely sinusoidal voltage across the capacitor, which is not necessarily a valid assumption. Both the Hingorani and Vithayathil schemes are susceptible to harmonic instabilities due to their reliance on the measurement of zero-crossings of the capacitor voltage.

U.S. Pat. No. 5,202,583, Apr. 13, 1993, titled, "Thyristor-Controlled Series Capacitor Vernier Control System," to Larsen et al., discloses a scheme for triggering thyristors of a TCSC that purportedly provides a very fast control over the capacitor voltage. The trigger control scheme relies on the measurement of line current, capacitor voltage, and thyristor current for its operation.

U.S. Pat. No. 5,227,713, Jul. 13, 1993, titled, "Vernier Control System for Subsynchronous Resonance Mitigation," to Bowler, discloses a system in which another control loop is added to the trigger control to dampen subsynchronous oscillations using measurements of line current and bus voltage on both sides of the series capacitor.

A problem with the Larsen and Bowler systems is that, due to the high speed at which the capacitor voltage is controlled, the trigger control system does not inherently mitigate subsynchronous resonance and, therefore, it requires external control loops. Another drawback is the requirement for measuring the capacitor voltage and thyristor current, which increases cost and detracts from the reliability of the control system.

Therefore, a need exists for an improved system for controlling a reactance in a reliable manner to mitigate unwanted oscillations. The present invention meets this need.

SUMMARY OF THE INVENTION

One aspect of the present invention provides an electric power system comprising a conductor for carrying line current and voltage waveforms; a reactive element coupled in series between the conductor and a transmission or distribution system or a load; means for monitoring line current waveforms; and means for dynamically controlling the reactance of the reactive element to dampen unwanted oscillations in the voltage and current waveforms. In a preferred embodiment of the invention, the reactive element comprises a thyristor-controlled series capacitor (TCSC). In this embodiment, the means for dynamically controlling the reactance of the reactive element comprises a control system for triggering at least one thyristor of the TCSC so as to mitigate subsynchronous or power swing oscillations in the voltage and current waveforms by making the reactive element appear as a small capacitor or as an inductor at subsynchronous frequencies and as a larger capacitor at the operating frequency.

A presently preferred embodiment of the invention provides a trigger control system for operating a TCSC in a manner that controls power flow, dampens power oscillations, and mitigates subsynchronous resonance. The TCSC has a series capacitor with a parallel thyristor circuit in series with an inductor. The present invention only requires the measurement of line currents to determine when to trigger the thyristors. Through the action of the trigger control system, the TCSC appears either as a small capacitor or as an inductor at subsynchronous frequencies and appears as a larger capacitor at the operating frequency. The speed of response of the TCSC is intentionally slowed to mitigate subsynchronous resonances.

The trigger control can be optionally provided with other measurements, such as capacitor voltage, thyristor current, or thyristor conduction time in order to provide a precise control over the capacitor voltage and to prevent possible drifts in operation. These optional loops are preferably slow so as not to interfere with the basic operation of the trigger control system.

Other features and advantages of the present invention are disclosed below.

BRIEF DESCRIPTION OF THE DRAWINGS

FIGS. 4A–4C depict waveforms contrasting the performance of the present invention with that of a conventional series compensation system.

DETAILED DESCRIPTION OF PREFERRED EMBODIMENTS

The present invention provides methods and apparatus for controlling the reactance of a transmission line element (such as, e.g., a TCSC) so as to mitigate unwanted oscillations on the line. One preferred embodiment of the invention provides a trigger control system for thyristor-controlled series capacitors, for mitigating power swing oscillations and three known types of subsynchronous resonance oscillations, namely, induction generator effects, torsional interactions, and transient torque amplification. The system permits precise control over the amount of charge passing through the thyristors and the voltage across the capacitor. This facilitates the control of power flow through the compensated transmission line. The inventive system for triggering the TCSC makes the device appear either inductive or as a smaller capacitor at frequencies below the operating frequency while making the TCSC appear as a large capacitor at the operating frequency. The basic trigger control system employs only the three-phase line currents for operation, although the system optionally can be interfaced to higher level controllers. The system intentionally slows the charging of the capacitor through the thyristors in order to mitigate subsynchronous resonances. In addition, the system prevents the series capacitor from storing a high level of energy during a major fault, thereby mitigating transient torque amplification in generators and excessive voltages and currents in the compensated line.

Figure 1:
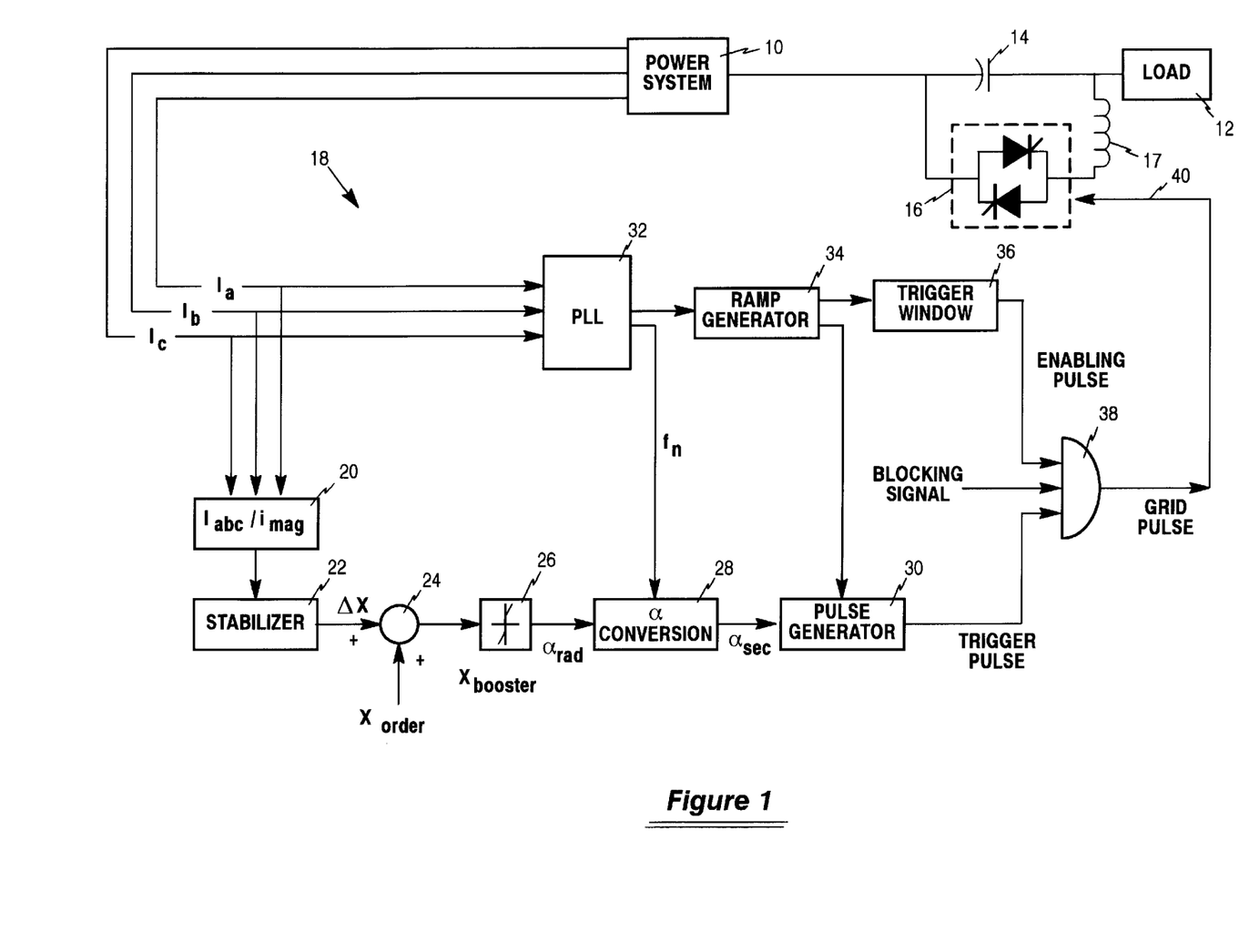
FIG. 1 is a block diagram of one presently preferred embodiment of the invention.

FIG. 1 depicts one presently preferred embodiment of the invention. As shown, a power system 10 is coupled to a load 12 by a series capacitor 14 connected in parallel to a thyristor unit 16 and inductor 17. (The load 12 is used herein to represent generally a load, transmission or distribution system). The thyristors are controlled, or triggered, by a control system 18. The control system 18 includes a first circuit 20, labelled $I_{abc}/I_{mag}$, which generates signals proportional to the peak of the line currents. This calculation can be based on either three-phase current measurements or on single-phase measurements. In addition, the control system 18 includes a stabilizer circuit 22, an adder 24, a look-up table 26, a conversion circuit 28, a pulse generator 30, a phase-locked loop (PLL) 32, a ramp generator 34, a trigger window circuit 36, and a three input AND gate 38. The output of the AND gate 38 is a grid pulse signal 40, which triggers the thyristor unit 16.

It should be noted that FIG. 1 only depicts the phase A controller. The phase B and C controllers are identical. Each of the blocks of the control system of FIG. 1 will now be described.

As mentioned above, the $I_{abc}/I_{mag}$ block 20 generates signals proportional to the peak of the phase line currents. The stabilizer block 22 is a signal filtering block that shapes the signal contents of the "$I_{mag}$" signal in order to suppress some frequency bands and amplify others. The stabilizer generates a modulation signal "$\Delta X$" to the requested TCSC reactance "$X_{order}$". The objective of the "$\Delta X$" signal is to add damping to the power oscillation modes and possible torsional oscillation modes.

The $X_{booster}$ block 26 is a one-dimensional look-up table that converts the required TCSC reactance "$X_{order}$" to a trigger delay angle "$\alpha_{rad}$". The effective action of the $X_{booster}$ block 26 is to render the relationship between the required reactance "$X_{order}$" to the actual generated reactance linear in steady-state.

The $\alpha$ conversion block 28 converts the desired trigger delay angle "$\alpha_{rad}$" from radians to a required delay time in seconds, denoted "$\alpha_{sec}$". This function utilizes the frequency signal "$f_n$" from the PLL 32. When the frequency signal is outside small variations from normal operating frequency, then the frequency signal "$f_n$" is clipped before being used. This enables the trigger control to effectively trigger the thyristors early when a severe disturbance takes place. Such action reduces the transient torques on the turbine-generator shaft (not shown) and the voltage and current excursions in the power system 10.

The pulse generator 30 issues a triggering pulse to the appropriate thyristor when the timing signal from the ramp generator 34 exceeds the trigger delay angle "$\alpha_{sec}$". The trigger pulse, the trigger window, and an external blocking signal are combined through AND gate 38 to send a grid pulse to the thyristor unit 16.

The phase-locked loop, or PLL, 32 employs the three-phase transmission line currents, which are measured using current transformers (not shown) and then fed back to the controller 18. The PLL 32 accepts the three phase currents and generates three synchronization signals, each of which is synchronized to one phase current. The speed of response of the PLL is intentionally slowed to limit the response of the TCSC to subsynchronous line currents. The PLL also generates the signal "$f_n$", which is proportional to the line frequency.

The ramp generator 34 converts the synchronization signal from the PLL 32 to two ramp functions, one for each thyristor in a phase. The ramp generator serves as a timer that is reset whenever the synchronization signal switches polarity.

The trigger window circuit 36 establishes a window of time during which it is safe to trigger a thyristor. The trigger window does not allow thyristor triggering outside this safe window.

Figure 2:
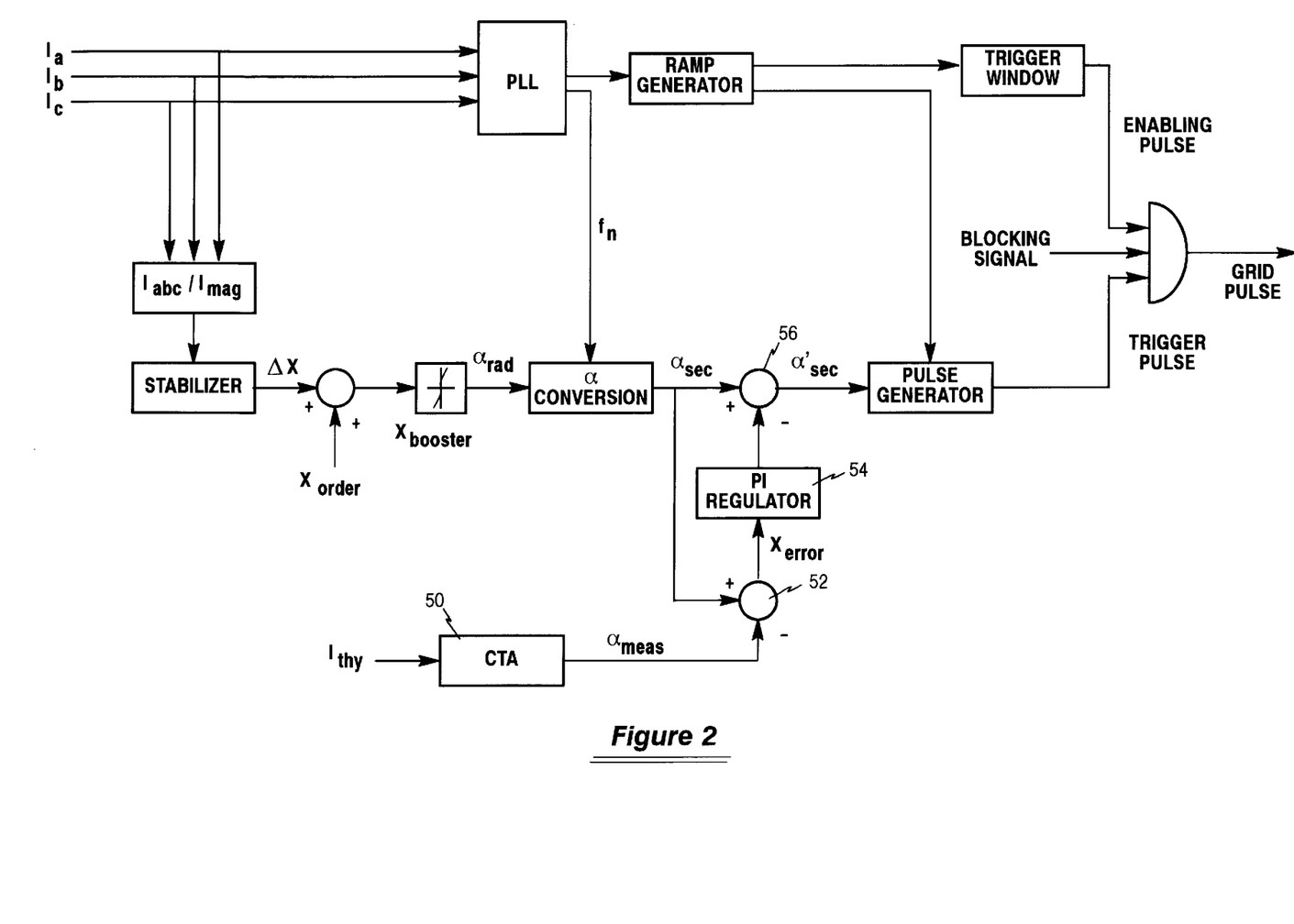
FIG. 2 is a block diagram of an alternative embodiment of the present invention. In this embodiment, thyristor current "$I_{thy}$" is fed back as a measure of the TCSC triggering angle, and this is used to optimize the timing of he triggering pulse.

FIG. 2 depicts a first alternative embodiment of the present invention. In the system of FIG. 2, the performance of the above-described conduction angle control system is enhanced by feedback of the measured thyristor current "$I_{thy}$" to a CTA circuit 50, which calculates the measured triggering angle $\alpha_{meas}$ based on the measured thyristor current. The triggering angle is then input to an adder 52 along with "$\alpha_{sec}$" to derive an error signal "$\alpha_{error}$". The error signal "$\alpha_{error}$" is fed to a PI regulator 54, which outputs a regulated error signal to an adder 56. The adder 56 compares the regulated error signal with "$\alpha_{sec}$" to produce a corrected trigger delay time "$\alpha'_{sec}$".

Figure 3:
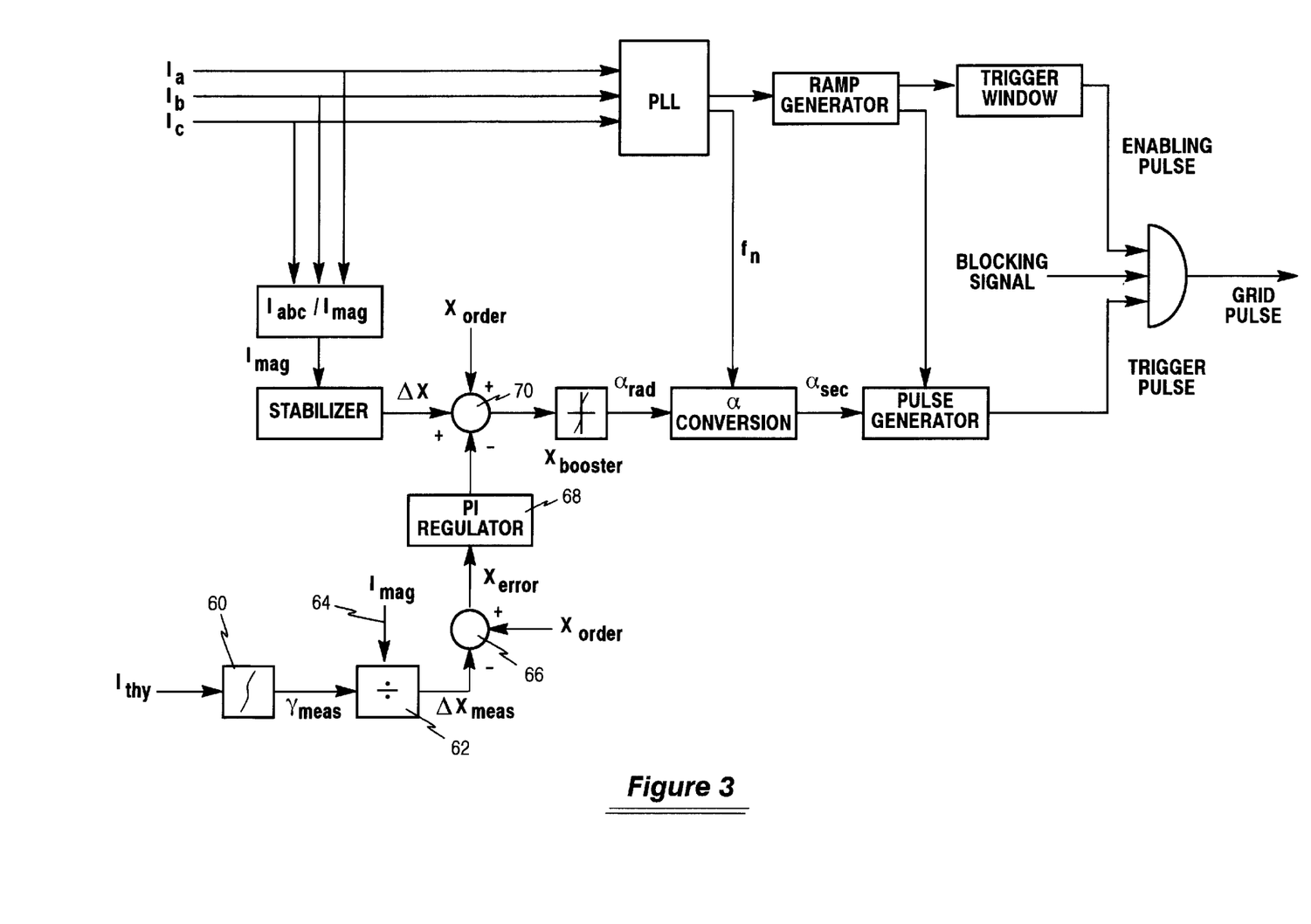
FIG. 3 is a block diagram of another alternative embodiment of the present invention. In this embodiment, the integrated thyristor current is employed as a measure of the effective TCSC reactance, and the measured reactance is then used to correct the "$X_{order}$" signal supplied to the $X_{booster}$ circuit.

FIG. 3 depicts a second alternative embodiment of the present invention. In this embodiment, the thyristor current "$I_{thy}$" is integrated by an integration circuit 60 to produce a signal "$\gamma_{meas}$", which is a measure of the effective change passing through the thyristors. This is input to a divider circuit 62 that divides "$\gamma_{meas}$" by "$I_{mag}$" to produce a measure of the reactance "$\Delta X_{meas}$". This measured reactance is input to an adder 66 along with "$X_{order}$" to produce a measure "$X_{error}$" of the error in the "$X_{order}$" signal. A regulator 68 provides a regulated error signal to an adder 70, which subtracts the error signal from the summed value of "$X_{order}$"+"$\Delta X$".

Figure 4A:
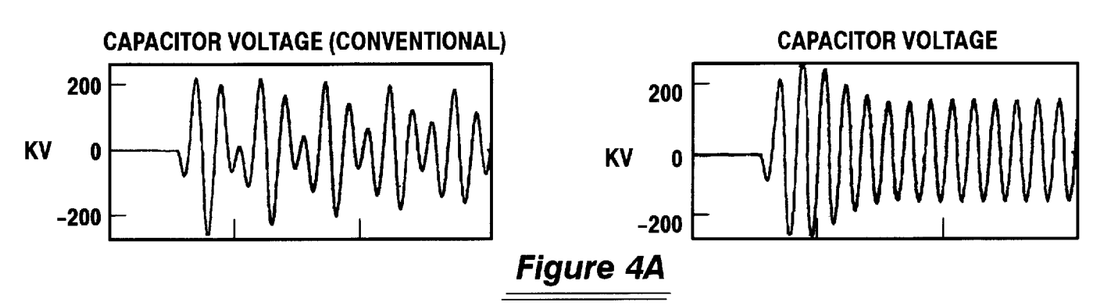
FIG. 4A contrasts the voltage across a conventional series capacitor with the voltage across a thyristor-controlled series capacitor controlled in accordance with the present invention.
Figure 4B:
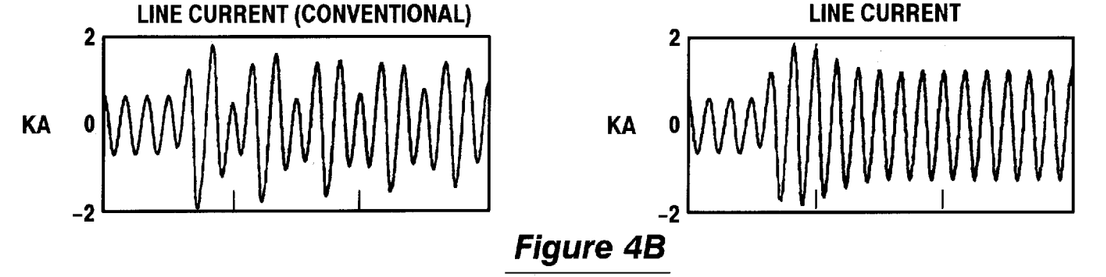
FIG. 4B contrasts the line current with and without the invention, and FIG. 4C contrasts the thyristor current with and without the invention, respectively.
Figure 4C:
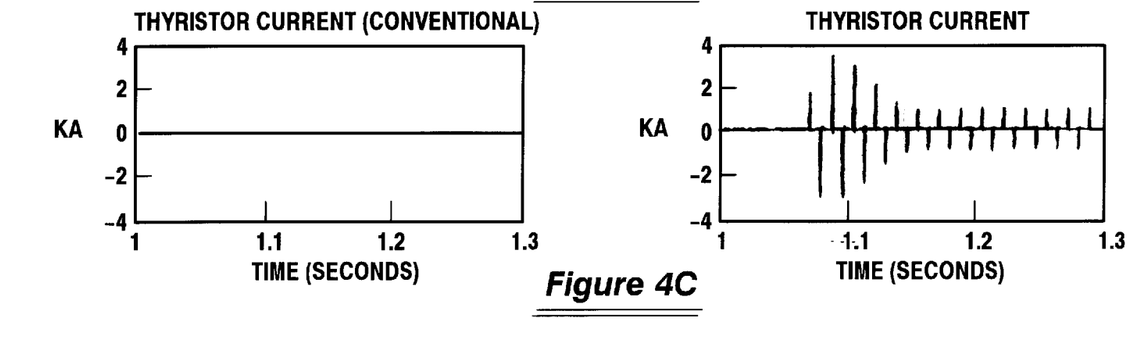

FIGS. 4A–4C contrast the performance of conventional series compensation with that of thyristor-controlled series compensation with conduction angle triggering control as disclosed by the present specification. These figures represent a 75% series capacitor inserted by opening a bypass breaker (not shown) for the installation at 1.05 seconds.

FIG. 4A compares the voltage across a conventional series capacitor with the voltage across the thyristor-controlled series compensation element. For the conventional installation, the waveform of which is shown on the left, this capacitor voltage increases from 0 kV prior to insertion to a new steady-state voltage (123 kV) determined by current system conditions, i.e., system load and level of compensation, once the capacitor is inserted.

In addition to the fundamental frequency voltage component, the capacitor voltage exhibits subsynchronous oscillations at a natural frequency determined by the series capacitance and system inductance. In contrast, with the present invention's thyristor-controlled compensation with conduction angle triggering control scheme, the subsynchronous component is eliminated by controlled triggering of the reactor in parallel with the series capacitor, as represented by FIG. 4C, and the capacitor voltage reaches steady-state (146 kV) in approximately six cycles, as shown. The 23 kV increase in the steady-state capacitor voltage is the result of the reactance boost provided by steady-state conduction in the thyristor-controlled reactor.

Similarly, FIG. 4B compares the line current in a conventionally compensated transmission line with the line current in the TCSC triggered by the conduction angle triggering control system disclosed herein. As shown, current increases from 650 amps to 1,160 amps with 75% conventional series compensation whereas it increases to 1,280 amps with the TCSC triggered in accordance with the present invention. This current increase is the result of the reactance boost provided by controlled firing of the thyristors. The subsynchronous component of the line current is eliminated and the line current reaches steady-state in six cycles, as shown.

Figure 5A:
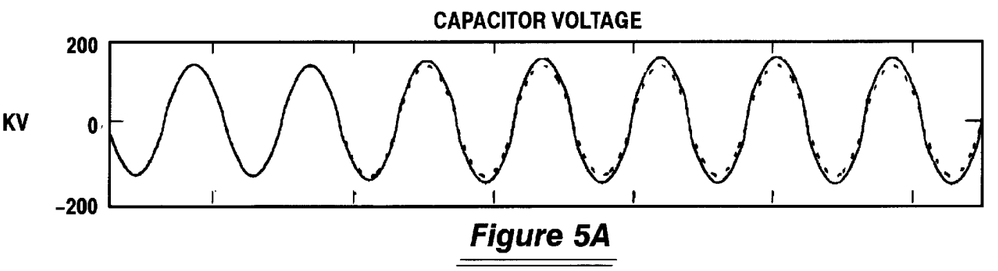
FIGS. 5A–5C depict waveforms illustrating the steady-state operation of the present invention and the response of the control system to a step increase in the reactance order for the system.
Figure 5B:
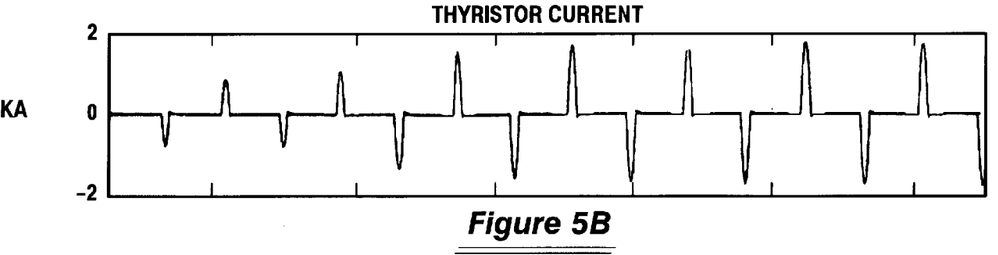
Figure 5C:
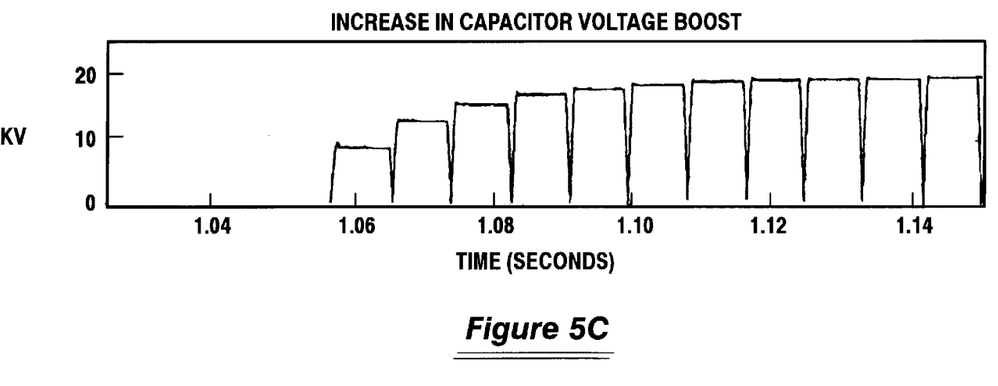
Figure 6A:
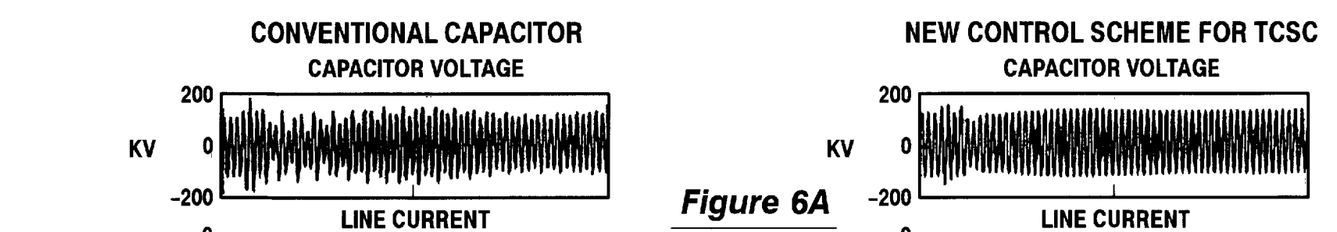
FIGS. 6A–6E contrast the dynamic performance of conventional series compensation with that of the present invention.
Figures 6B, 6C:
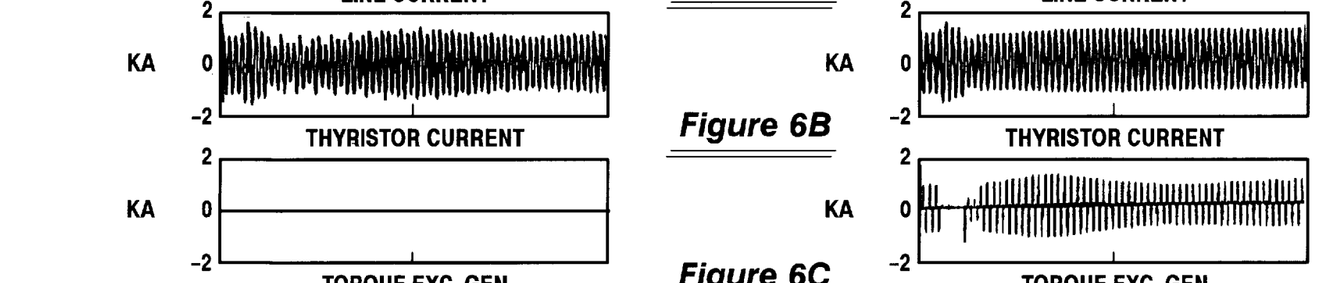
Figure 6D:
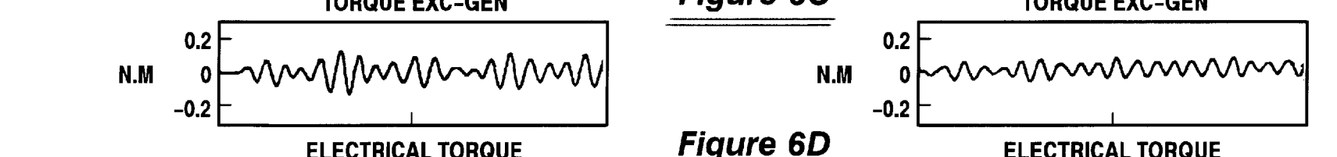
Figure 6E:
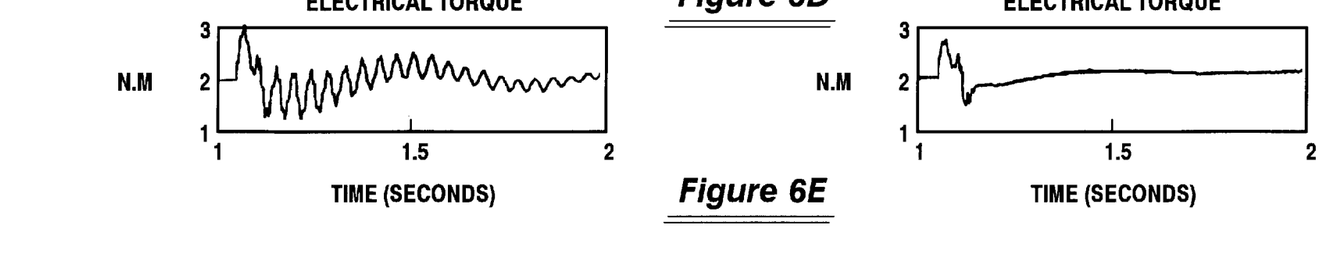

FIGS. 5A–5C illustrate steady-state operation of the control system and the response of the control system to a step increase in the reactance order for the system. FIG. 5A illustrates the steady state series capacitor voltage and the voltage response to a step increase in the reactance order at 1.05 second. In FIG. 5A, the dotted waveform represents the series capacitor voltage without the step increase in reactance order. The increase in the reactance order results in an increase in the current in the thyristor-controlled reactor in parallel with the series capacitor, represented in FIG. 5B, which in turn corresponds to a 20 kV increase in the voltage across the series capacitor, as shown in FIG. 5C. The capacitor voltage reaches the new steady state three cycles after the reactance order is increased, since the triggering control intentionally slows down the charging of the capacitor through the thyristors to mitigate subsynchronous resonances.

FIG. 6 compares the dynamic performance of conventional series compensation with that of the present invention during small system disturbances. The 75% series compensated transmission line is subjected to a three cycle, three phase line fault at 1.05 seconds. FIGS. 6A and 6B illustrate the resulting series capacitor voltages and line currents for both configurations once the fault is cleared. In addition to the fundamental frequency component, the conventional series capacitor installation exhibits subsynchronous oscillations in voltage and current at a natural frequency determined by the series capacitance and system inductance. For thyristor-controlled compensation with conduction angle triggering in accordance with the present invention, however, the subsynchronous component is eliminated by controlled triggering of the reactor in parallel with the series capacitor. The triggering control intentionally slows the charging of the capacitor through the thyristors and prevents the series capacitor from storing a high level of energy during the fault in order to mitigate subsynchronous resonances and transient torque amplification in generators, and to prevent excessive voltages and currents in the compensated line. The modulated thyristor current is illustrated in FIG. 6C, while representative generator mechanical and electrical torques are illustrated in FIGS. 6D and 6E, respectively.

The preferred embodiments of the present invention can be distinguished over the prior art in a variety of ways. For example, the control philosophy in Larsen's system is to provide a fast control over the capacitor voltage. To accomplish this, Larsen employs a two-dimensional look-up table. This fast control philosophy is counter-effective to providing inherent SSR mitigation. In practice, it can require a high boosting level of the capacitors in steady-state. This requires many capacitor cans in parallel, which can be expensive. The control philosophy of the present invention is to have a slow tracking of the required capacitor voltage, which, with the proposed control structure, improves the inherent SSR damping capability of the TCSC without the need for high boosting levels in steady-state. In addition, to achieve the fast control over capacitor voltage, Larsen's system requires measurements of capacitor voltages, line currents, and thyristor currents. These added sensor requirements add to the cost of the installation. In contrast, the present invention relies on the measurement of only line current in order to trigger the thyristors. Moreover, Larsen's system does not deal with severe power system disturbances such as faults. The present invention has a built-in ability to deal with these disturbances by forcing the triggering of the thyristors as early as possible within the thyristor's capabilities.

The present invention is not limited to the exemplary embodiments disclosed in detail above. For example, the TCSC could be coupled to a load, transmission or distribution system.

We claim:

1. An electric power system, comprising:
   (a) a conductor for carrying line current and voltage waveforms;
   (b) a reactive element coupled to said conductor;

(c) means for monitoring at least one of said line current and voltage waveforms; and (d) means for dynamically controlling the reactance of said reactive element to dampen unwanted oscillations in said line current and voltage waveforms said reactive element comprising a thyristor-controlled series capacitor (TCSC) and an inductor coupled to said capacitor, said means for dynamically controlling the reactance of said reactive element comprising a control system for triggering at least one thyristor of said TCSC so as to mitigate subsynchronous or power swing oscillations in said line current and voltage waveforms by making said reactive element appear as a small capacitor or as an inductor at subsynchronous frequencies and as a larger capacitor at the operating frequency, the speed of response of the capacitor being slowed to mitigate subsynchronous resonances.

2. An electric power system, comprising:

(a) a conductor for carrying line current and voltage waveforms;

(b) a reactive element coupled to said conductor;

(c) means for monitoring at least one of said line current and voltage waveforms; and (d) means for dynamically controlling the reactance of said reactive element to dampen unwanted oscillations in said line current and voltage waveforms said reactive element comprising a thyristor-controlled series capacitor (TCSC) and an inductor coupled to said capacitor, said means for dynamically controlling the reactance of said reactive element comprising a control system for triggering at least one thyristor of said TCSC so as to mitigate subsynchronous or power swing oscillations in said line current and voltage waveforms by making said reactive element appear as a small capacitor or as an inductor at subsynchronous frequencies and as a larger capacitor at the operating frequency, the speed of response of the capacitor being slowed to mitigate subsynchronous resonances, said means for dynamically controlling the reactance of said reactive element comprising:

a first circuit coupled to said conductor for generating a signal ($I_{mag}$) proportional to the peak of a line current;

a stabilizer circuit coupled to said first circuit for shaping the signal contents of the ($I_{mag}$) signal to suppress some frequency bands and amplify others, the stabilizer generating a modulation output signal ($\Delta X$);

an adder coupled to said stabilizer circuit, said adder receiving the output ($\Delta X$) of said stabilizer circuit and a signal ($X_{order}$) indicative of a requested TCSC reactance;

a look-up table coupled to said adder for converting the requested TCSC reactance ($X_{order}$) to a trigger delay angle ($\alpha_{rad}$), wherein the effect of the look-up table is to linearize in steady-state the relationship between the reactance ($X_{order}$) and an actual generated reactance of the reactive element;

a conversion circuit coupled to said look-up table for converting the requested trigger delay angle ($\alpha_{rad}$) from radians to a required delay time in seconds ($\alpha_{sec}$);

a pulse generator coupled to said conversion circuit for issuing a triggering pulse when a ramp signal exceeds the trigger delay angle ($\alpha_{sec}$);

a phase-locked loop (PLL) coupled to said conductor for receiving measurements of a line current or voltage and generating a synchronization signal and a frequency signal ($f_n$) proportional to the line frequency;

a ramp generator coupled to said PLL for receiving said synchronization signal and generating the ramp signal;

a trigger window circuit coupled to said ramp generator for receiving the ramp signal and establishing a window of time during which it is safe to trigger a thyristor; and a three input AND gate for receiving an enabling pulse from said trigger window circuit, a blocking signal and the triggering pulse from said pulse generator, and providing a grid pulse signal for triggering a thyristor of said TCSC.

3. A system as recited in claim 2, wherein the conversion circuit receives the frequency signal ($f_n$) from the PLL, and, when the frequency is outside a prescribed range, clipping the frequency signal ($f_n$) to thereby enable the control system to trigger a thyristor early when a severe disturbance takes place, whereby transient torque on a turbine-generator shaft of the power system and voltage and current excursions in the power system are reduced.

4. A system as recited in claim 3, wherein the speed of response of the PLL is slowed to limit the response of the TCSC to subsynchronous line currents.

5. A method for dynamically damping unwanted oscillations in voltage and current waveforms of a power system, comprising the steps of:

(a) monitoring at least one voltage or current waveform on a conductor of the power system; and (b) dynamically controlling the reactance of a reactive element coupled in series between said conductor and a load to dampen unwanted oscillations in said voltage and current waveforms, said reactance being controlled so that said reactive element appears as a small capacitor or as an inductor at a first range of frequencies and as a larger capacitor at another range of frequencies said reactive element comprising a thyristor-controlled series capacitor (TCSC) and an inductor coupled to said capacitor, said step of dynamically controlling the reactance of said reactive element comprising triggering at least one thyristor of said TCSC so as to mitigate subsynchronous or power swing oscillations in said voltage and current waveforms by making said reactive element appear as a small capacitor or as an inductor at subsynchronous frequencies and as a larger capacitor at the operating frequency, the speed of response of the capacitor being slowed to mitigate subsynchronous resonances.

6. In an electric power system comprising a conductor for carrying line current and voltage waveforms and a reactive element coupled to said conductor, said reactive element comprising a thyristor-controlled series capacitor (TCSC) and an inductor coupled to said capacitor, a control system for dynamically controlling the reactance of said reactive element to dampen unwanted oscillations in said voltage and current waveforms, the control system comprising:

a first circuit coupled to said conductor for generating a signal ($I_{mag}$) proportional to the peak of a line current;

a stabilizer circuit coupled to said first circuit for shaping the signal contents of the ($I_{mag}$) signal to suppress some frequency bands and amplify others, the stabilizer generating a modulation output signal ($\Delta X$);

an adder coupled to said stabilizer circuit, said adder receiving the output ($\Delta X$) of said stabilizer circuit and a signal ($X_{order}$) indicative of a requested TCSC reactance;

a look-up table coupled to said adder for converting the requested TCSC reactance ($X_{order}$) to a trigger delay angle ($\alpha_{rad}$), wherein the effect of the look-up table is to linearize in steady-state the relationship between the reactance ($X_{order}$) and an actual generated reactance of the reactive element;

a conversion circuit coupled to said look-up table for converting the requested trigger delay angle ($\alpha_{rad}$) from radians to a required delay time in seconds ($\alpha_{sec}$);

a pulse generator coupled to said conversion circuit for issuing a triggering pulse when a ramp signal exceeds the trigger delay angle ($\alpha_{sec}$);

a phase-locked loop (PLL) coupled to said conductor for receiving measurements of a line current or voltage and generating a synchronization signal and a frequency signal ($f_n$) proportional to the line frequency;

a ramp generator coupled to said PLL for receiving said synchronization signal and generating the ramp signal;

a trigger window circuit coupled to said ramp generator for receiving the ramp signal and establishing a window of time during which it is safe to trigger a thyristor; and a three input AND gate for receiving an enabling pulse from said trigger window circuit, a blocking signal and the triggering pulse from said pulse generator, and providing a grid pulse signal for triggering a thyristor of said TCSC.

7. A control system as recited in claim 6, wherein said means for dynamically controlling the reactance of said control system triggers at least one thyristor of said TCSC so as to mitigate subsynchronous or power swing oscillations in said voltage and current waveforms by making said reactive element appear as a small capacitor or as an inductor at subsynchronous frequencies and as a larger capacitor at the operating frequency.

* * * * *